(No Model.)
A. P. MASSEY.
AUTOMATIC VALVE FOR REGULATING FLUID PRESSURE.
No. 426,507. Patented Apr. 29, 1890.
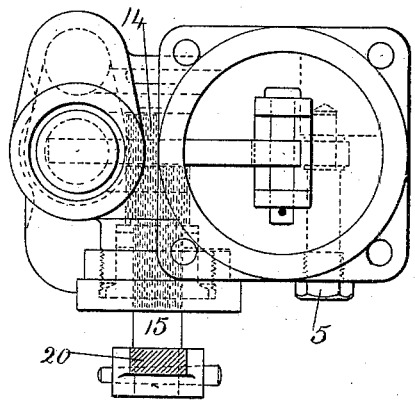
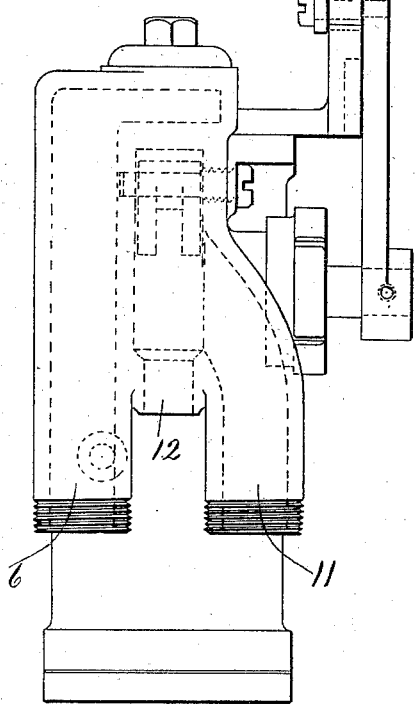
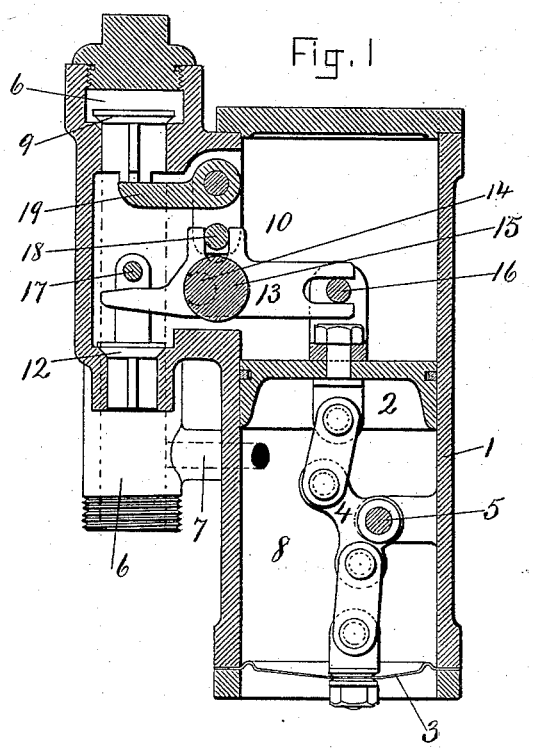
WITNESSES
INVENTOR
Albert P. Massey

UNITED STATES PATENT OFFICE.

ALBERT P. MASSEY, OF WATERTOWN, NEW YORK.

AUTOMATIC VALVE FOR REGULATING FLUID-PRESSURE.

SPECIFICATION forming part of Letters Patent No. 426,507, dated April 29, 1890.

Application filed January 20, 1890. Serial No. 337,419. (No model.)

*To all whom it may concern:*

Be it known that I, ALBERT P. MASSEY, a citizen of the United States, residing in the city of Watertown, in the county of Jefferson and State of New York, have invented certain new and useful Improvements in Automatic Valves for Regulating Fluid-Pressure, of which the following, taken in connection with the accompanying drawings, is a specification.

My invention relates especially to operating air-brakes; but it will prove useful in many cases where a fluid-pressure is to be varied at the will of the operator.

This invention comprises improvements on a fluid-pressure valve patented to me March 8, 1887, No. 355,866.

It consists of an arrangement of valves and levers in connection with differential pistons in such a manner as to close the valves automatically when a desired difference in pressure is attained.

Figure 1 is a sectional view of the internal mechanism. Fig. 2 is an end view. Fig. 3 is a top view.

1 is a cylindrical case, in which are fitted a piston 2 and a flexible diaphragm 3. This piston and diaphragm are both attached by links to a bell-crank lever 4, turning about a fixed fulcrum 5. The arms of the bell-crank 4 are placed at such an angle with each other that when it revolves about its fulcrum toward the piston the effective leverage of the diaphragm 3 increases, while the effective leverage of the piston 2 decreases.

6 is a tube, which may be connected with a reservoir containing compressed air. This is open through passage 7 to the interior of the case 8 between the piston and diaphragm. It is also open to the top of valve 9. The space 10 above the piston is open to tube 11, and thence to a pipe or reservoir, in which an air-pressure is desired different from that in tube 6 and its reservoir.

9 is a valve between tube 6 and chamber 10.

12 is a valve between chamber 10 and the atmosphere.

13 is a lever fulcrumed on an eccentric-stem 14 of the spindle 15. One end of lever 13 is connected to the piston 2 by the pin 16. The other end projects under pin 17 in valve 12. This lever also has a slot that incloses pin 18 on lever 19, through which it actuates lever 19. The spindle 15 passes through the side of the valve-case and is actuated by the lever and handle 20.

When this invention is placed on a locomotive to actuate air-brakes, the tube 6 is connected to the main air-reservoir, which is kept supplied with compressed air by a pump. The tube 11 is connected to the train-pipe. When the train is running, the air in the train-pipe is kept at or near the pressure in the main reservoir.

To apply the brakes moderately, the air-pressure is reduced a definite amount, which causes the valves under the cars to act and admit a light air-pressure to the brake-cylinders. To apply the brakes with full force, the pressure in the train-pipe is still further reduced. To release the brakes, the pressure in the train-pipe is restored to its normal pressure.

The operation of this invention, to accomplish the above action, is as follows: As shown in the drawings, valve 9 is open, and consequently there is the same air-pressure in the reservoir and in the train-pipe. The pressure is therefore the same on both sides of the piston 2. As piston 2 is in equilibrium, the air-pressure on the diaphragm 3 forces it downward and turns the bell-crank 4 in the position shown. If now the spindle 15 is turned a little, moving the eccentric-pin 14 upward and toward the right, it will swing lever 19 away from valve 9 and allow it to close by gravity. It will also raise valve 12 by means of the pin 17, and allow air to escape from chamber 10 to the atmosphere. When the pressure in chamber 10 is reduced below that in chamber 8, the piston 2 is no longer in equilibrium, but is pressed upward with a force equal to the difference in the two pressures. This upward pressure is resisted by the pressure on the diaphragm 3 in a downward direction; but the effective leverage of the piston 2 on the bell-crank 4 is much greater than that of the diaphragm 3 on the same bell-crank. The piston therefore starts upward. As the piston moves upward, its effective leverage on the bell-crank decreases, while that of the diaphragm increases, and when the effective leverages become equal inversely to the opposing forces the upward movement of the piston will cease. The distance to which the piston will travel, therefore, depends on the difference of pressures on its opposite sides. When the piston rises, it raises one end of lever 13 and allows valve 12 to close. If the fulcrum of the lever is raised by the eccentric-pin 14 but a little, the piston 2 will need to rise but little to allow valve 12 to close, and therefore it will close when the pressure in chamber 10 is reduced a little. If the fulcrum is raised higher, it will require a greater reduction of pressure in chamber 10 to raise the piston high enough to allow valve 12 to close, and consequently a greater amount of air will escape before the valve closes, and the train-pipe pressure will be reduced a greater amount. When the pressure in chamber 10 is much less than that in chamber 8, the eccentric-pin 14 will stand much higher than in the drawings, and the piston 2 will have raised enough to allow valve 12 to close. To restore the pressure in chamber 10, the spindle 15 is moved in the opposite direction. The lever 19 partakes of all the movements of lever 13, except that it approaches valve 9 when lever 13 recedes from valve 12, and it recedes from valve 9 when lever 13 approaches valve 12. Therefore when spindle 15 is turned in the opposite direction and brings the fulcrum of lever 13 downward and to the left it causes lever 19 to raise valve 9 and admit air from tube 6 to the chamber 10. As the pressure above the piston 2 increases, it destroys the balance between the piston and diaphragm, and the piston is therefore drawn downward by the excess of pressure on the diaphragm until the bell-crank 4 has revolved enough to equalize the leverages again. As the piston moves down, it causes the lever 19 through lever 13 to recede from valve 9. If the eccentric-pin 14 has been depressed but little, a slight motion of the piston will allow valve 9 to close; but if 14 has been depressed to its lowest position the piston would have to descend to its extreme position before the valve 9 could close. Therefore the operator can regulate the difference in pressure between the two chambers at will, and can increase or diminish them a definite amount by simply moving the handle a proper distance, as the valves will close automatically when the desired variation is accomplished.

It is obvious that a piston or a spring might be substituted for diaphragm 3.

Having thus described my improvements, what I claim as new, and desire to secure by Letters Patent, is—

1. In a fluid-pressure valve mechanism, two pistons or diaphragms connected by a bell-crank lever, so that the effective leverage of one increases when the effective leverage of the other decreases, a cylinder connected with a source of supply of fluid-pressure inclosing said pistons or diaphragms, so that they are exposed to the fluid-pressure on the inner sides, but one is exposed to atmospheric pressure on the outside and the other is exposed to the train-pipe pressure in a chamber connected with a train-pipe, a valve opening from the train-pipe chamber to the atmosphere, a lever connected at one end with said valve and at the other end with the piston mechanism, and a movable fulcrum for said lever, combined in such a manner that when the valve is opened by means of the lever and movable fulcrum the reduction of pressure in the train-pipe will allow the piston to raise the other end of the lever and close the valve, substantially as set forth.

2. In a fluid-pressure valve mechanism, a cylinder connected with a source of supply of fluid-pressure, a chamber connected with a train-pipe, a valve controlling an opening between these two chambers, a lever which actuates said valve, a valve-opening between the train-pipe chamber and the atmosphere, and a lever which actuates said valve, and also actuates the lever which actuates the valve between the cylinder and the train-pipe chamber, combined with a piston situated in the cylinder between the cylinder-reservoir and the train-pipe chamber to actuate said levers and valves, substantially as set forth.

3. In a valve mechanism for regulating the flow of fluid-pressure, the combination of a cylinder connected with a source of supply of fluid-pressure, a chamber connected with a train-pipe, a diaphragm between the cylinder-reservoir and the atmosphere, a piston between the cylinder-reservoir and the train-pipe chamber, a bell-crank lever connected to said diaphragm and piston by links, a lever with a movable fulcrum, a valve between the train-pipe and the atmosphere, a lever moving on a fixed fulcrum actuated by the lever on the movable fulcrum, and a valve between the train-pipe chamber and the cylinder-reservoir, substantially as set forth.

In testimony whereof I have signed my name to this specification, in the presence of two subscribing witnesses, on this 17th day of January, A. D. 1890.

ALBERT P. MASSEY.

Witnesses:
  MICHAEL J. MORKIN,
  H. D. MORGAN.